United States Patent [19]
Parruck

[11] Patent Number: 5,265,096
[45] Date of Patent: Nov. 23, 1993

[54] SONET ALARM INDICATION SIGNAL TRANSMISSION METHOD AND APPARATUS

[75] Inventor: Bidyut Parruck, Stratford, Conn.

[73] Assignee: TranSwitch Corporation, Shelton, Conn.

[21] Appl. No.: 725,674

[22] Filed: Jul. 3, 1991

[51] Int. Cl.$^5$ ................................................ H04J 3/12
[52] U.S. Cl. .................................... 370/110.1; 370/58.1
[58] Field of Search ................. 371/32; 370/110.1, 99, 370/58.1, 13, 94.1, 13.1; 359/115

[56] References Cited

U.S. PATENT DOCUMENTS

| | | | |
|---|---|---|---|
| 4,507,782 | 3/1985 | Kunimasa et al. | 371/32 |
| 4,961,180 | 10/1990 | Schwarz et al. | 370/13 |
| 4,967,405 | 10/1990 | Upp et al. | 370/58.1 |
| 4,996,683 | 2/1991 | Yamashita et al. | 370/13 |
| 5,018,132 | 5/1991 | Williams et al. | 370/13 |
| 5,134,614 | 7/1992 | Baydar et al. | 370/94.1 |

OTHER PUBLICATIONS

Section 6 of "Sonet Transport Systems: Common Generic Criteria" pp. 6-1 through 6-43, Issue 4, Feb. 1989, Bellcore Technical Advisory TA-TSY-000253.

*Primary Examiner*—Douglas W. Olms
*Assistant Examiner*—Shick Hom
*Attorney, Agent, or Firm*—David P. Gordon

[57] ABSTRACT

Methods and apparatus for quickly generating and transmitting SONET AIS signals are disclosed. Upon detecting a failure condition at the receiving side of a SONET terminating equipment, the SONET terminating equipment inserts an internal alarm control signal (e.g. a byte of all ones) into at least one predetermined transport overhead timeslot (e.g. E1). On the transmitting side, the transmitting SONET terminating equipment monitors the predetermined timeslot(s) and detects whether an indication of the internal alarm control signal has been received. If so, the transmitting SONET terminating equipment inserts an appropriate alarm in predetermined overhead and data timeslots of the outgoing SONET frame signal as specified by proposed AIS standards.

46 Claims, 13 Drawing Sheets

B DENOTES AN 8-BIT BYTE

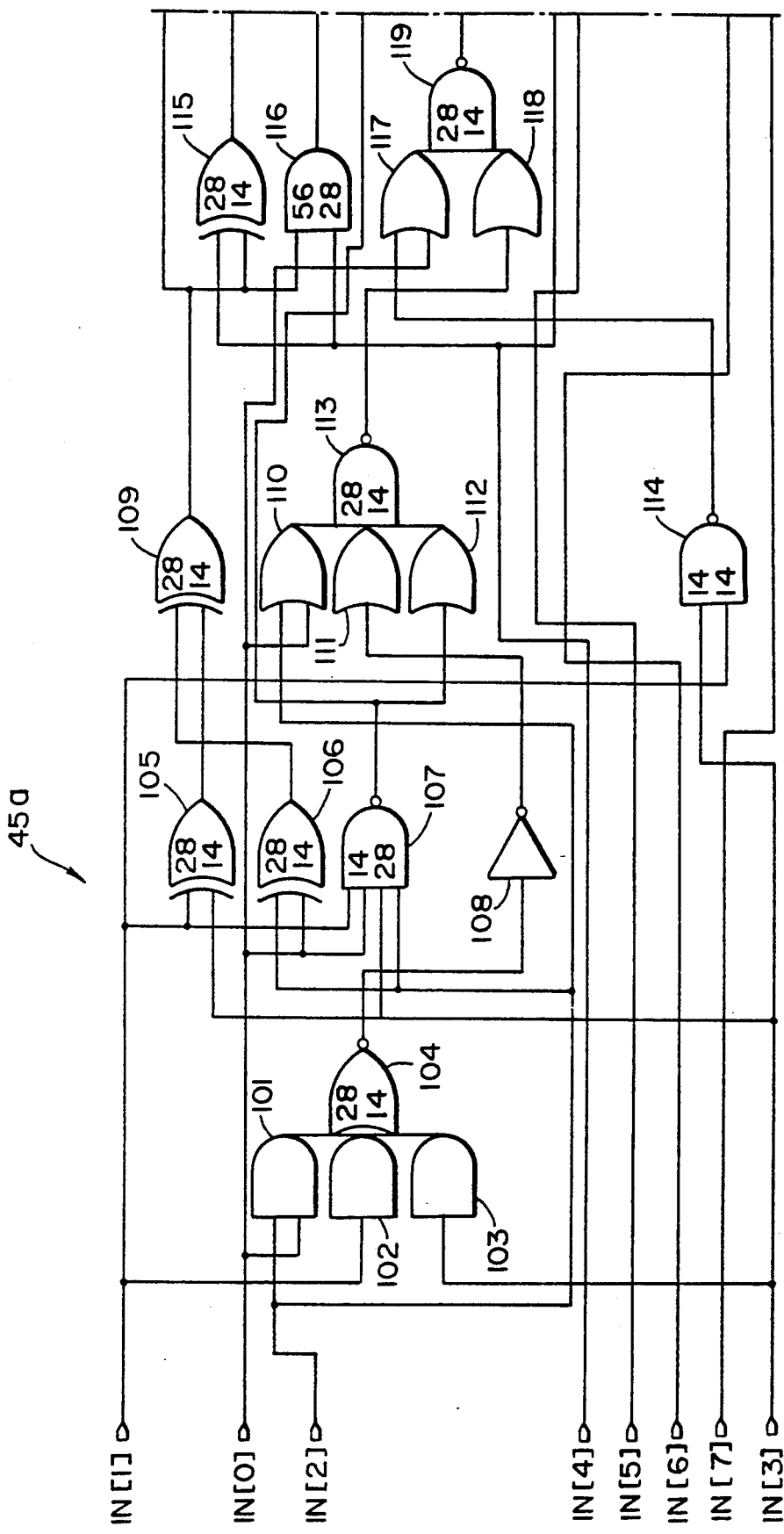

| FIG.7b-1 | FIG.7b-2 |

SONET ALARM INDICATION SIGNAL TRANSMISSION METHOD AND APPARATUS

BACKGROUND OF THE INVENTION

This invention relates generally to high speed digital telecommunication systems. The invention more particularly relates to alarm indication signals whose generation is required according to proposed standards for the synchronous optical network (SONET).

The telecommunications network servicing the United States and the rest of the world is presently evolving from analog transmission to digital transmission with ever-increasing bandwidth requirements. Fiber optic cable has proved to be a valuable tool of such evolution, replacing copper cable in nearly every application from large trunks to subscriber distribution plants. Fiber optic cable is capable of carrying much more information than copper with lower attenuation.

In attempting to accommodate the protocols, equipment, and cables of the past while providing for the direction of the future, various standards and system requirements relating to fiber optic cables have been adopted. In particular, the T1 Standards Committees of ANSI have provided a draft document ANSI T1.105-1988 dated Mar. 10, 1988 which sets forth specifications for a rate and format of signals which are to be used in optical interfaces. Additional details and requirements are set forth in Technical Advisory publications SR-TSY-000202, - -000233, -000253, -000303 Issue 3 of Bell Communication Research (Bellcore). The provided specifications detail the SONET standard. SONET defines a hierarchy of multiplexing levels and standard protocols which allow efficient use of the wide bandwidth of fiber optic cable, while providing a means to merge lower level DS0 and DS1 signals in a common medium. In essence, SONET establishes a uniform, standardized transmission and signaling scheme which provides a synchronous transmission format that is compatible with all current and anticipated signal hierarchies. Because of the nature of fiber optics, expansion of bandwidth is easily accomplished.

A basic SONET signal, termed an STS-1 signal, is seen in FIG. 1. The SONET signal is a 51.84 Mhz, bit serial signal, having nine rows of ninety columns of eight bit bytes at a 125 microsecond frame rate. The first three columns of bytes in the SONET signal are termed the transport overhead (TOH) bytes which include section overhead and line overhead and are used for various control purposes as indicated in FIG. 2. The remaining eighty-seven columns of bytes constitute the STS-1 Synchronous Payload Envelope (SPE) as seen in FIG. 3. In the SPE are included path layer overhead bytes as indicated in FIG. 2.

Returning to FIG. 2, it is seen that the first two bytes A1 and A2 of the transport overhead are framing bytes which contain a specified framing pattern allowing synchronization of the basic SONET STS-1 signal. Three other bytes, H1, H2, and H3 form a pointer giving explicit information as to the location of the start of the SONET SPE (i.e. the "SPE phase"). The pointer bytes are required due to the fact that the position of the SPE is not fixed in time in the STS-1 frame, but is allowed to be displaced in time (i.e. a change in the location of the SPE in the frame over time constituted an SPE "phase" shift). Additional specified bytes of the transport overhead of an STS-1 frame are the C1 byte used for frame identification, the D1 through D12 bytes used for section and line data communications, the E1 and E2 bytes used for orderwire (i.e., voice data transmitted from a network element to another network element), the K1 and K2 bytes used for automatic protection switching (APS) signaling between Line level entities, the B1 and B2 bytes used for section error and line error monitoring (BIP-8), and the F1 byte used as desired by the network provider. The Z1 and Z2 bytes of the STS-1 frame are set aside for non-defined functions. Additional details of the use of these bytes may be found with reference to the above-referenced Bellcore publications.

Among other things specified in the proposed standards are requirements for maintenance of the SONET system, including failure detection and reporting. In particular, as set forth in Bellcore document TA-TSY-00253 (Issue 4, February 1989), which is hereby incorporated by reference herein in its entirety, various failure states such as loss of signal (LOS), loss of frame (LOF), loss of pointer (LOP), must be detected and reported. Details of LOS, LOF, and LOP are found at section 6.3.1.1.1, 6.3.1.1.2, and 6.3.1.1.3 of TA-TSY-00253. In response to the detection of failure, and in accord with section 6.3.1.2. of TA-TSY-00253, an alarm indication signal (AIS) must be sent. The particular AIS signal which is sent is dependent on the type of equipment sending the signal. For example, as defined in section 6.3.1.2.1, a Line AIS is sent by a STE (section terminating equipment) to alert a downstream LTE (line terminating equipment) that a failure has been detected. The Line AIS is supposed to be generated within 125 μsec after detection of a failure state by the STE. The signal generated by the STE to alert the downstream LTE of failure is an OC-N signal that contains valid Section overhead and a scrambled all-ones pattern for the remainder of the signal (i.e., for the line overhead bytes and SPE).

A STS-Path AIS is sent by a line terminating equipment (LTE) to a downstream STE within 125 μsec of failure detection, and comprises an all ones signal in H1, H2, H3, and in the entire STS SPE. Details of the STS-Path AIS are set forth in section 6.1.2.2 of TA-TSY-00253. Other alarm indication signals include a VT-Path AIS and a DSn AIS which are specified in sections 6.3.1.2.3 and 6.3.1.2.4 of TA-TSY-00253. FIGS. 6–3 through 6–13 set forth which type of AIS is generated depending upon the type of equipment which is generating the AIS, and the type of failure which is detected.

While alarm indication signal requirements are set forth in the proposed standards, no method or apparatus is set forth for generating those signals in the short time frame allotted. Clearly, such methods and apparatus are required. An obvious solution to quickly generating the signals is to use a "hardwire" arrangement between the two ends of the terminating equipment. The problem with this solution is the requirement of an additional wire, which in cross-connect applications means an additional cross-connect matrix.

SUMMARY OF THE INVENTION

It is therefore an object of the invention to provide methods and apparatus for quickly generating and transmitting SONET AIS signals without the need for an extra hardwire.

It is another object of the invention to provide methods and apparatus for generating AIS signals where one or more bytes of the transport overhead of a SONET frame are utilized as an internal control signal of the equipment detecting a failure.

It is a further object of the invention to provide methods and apparatus for generating Path and Line AIS signals within 125 μsecs upon detecting a failure.

In accord with the objects of the invention, the method broadly comprises: upon detecting a failure condition at the SONET terminating equipment, inserting an internal alarm control signal into at least one predetermined transport overhead timeslot; and upon detecting an indication of the internal alarm control signal within the SONET terminating equipment, inserting an appropriate alarm in predetermined overhead and data timeslots of the outgoing SONET frame signal. Preferably, the internal alarm control signal is a byte of all ones which is inserted into the predetermined byte timeslot(s) of the TOH; and preferably, upon detecting a majority of ones in the predetermined byte timeslot(s), the SONET terminating equipment multiplexes an all one code into appropriate locations of the payload and overhead timeslots of the outgoing SONET signal. The preferred timeslot for the internal alarm control signal is the E1 timeslot. To guarantee that the outgoing alarm indication signal is generated within 125 μsecs after an alarm condition is detected, at least two TOH timeslots are utilized for the internal alarm control signal.

The apparatus for carrying out the method of the invention broadly comprises: an alarm control signal introduction circuit which, upon an indication of a failure condition, inserts an internal alarm control signal into a predetermined transport overhead timeslot of a SONET signal; an internal alarm detector circuit for detecting the internal alarm control signal; and an outgoing SONET alarm circuit which inserts a desired alarm indication signal into an outgoing SONET signal when said internal alarm detector circuit detects the indication of the internal alarm.

The alarm control signal introduction circuit, the internal alarm detector circuit, and the outgoing SONET alarm circuit can all take any of numerous forms. For example, the alarm control signal introduction circuit can constitute a circuit for overwriting a RAM location which stores the E1 and/or other designated TOH bytes of the SONET signal with a predetermined code such as all ones. The RAM location of the alarm control signal would be overwritten upon the alarm control signal introduction circuit receiving the indication of the failure condition. Alternatively, the alarm control signal introduction circuit can effectively constitute a register containing a predetermined code, and a multiplexer which is controlled to obtain data from that register during the E1 or other designated TOH byte timeslot when a failure condition is indicated. The internal alarm detector circuit can constitute a logic circuit for determining whether or not an indication of the internal alarm code has been received. Alternatively, the internal alarm detector circuit can constitute a shift register and counter for counting the number of ones received in the designated TOH byte timeslot which would also determine whether or not an indication of the internal alarm code has been received.

Additional objects and advantages of the invention will become apparent to those skilled in the art upon reference to the detailed description in conjunction with the accompanying drawings.

BRIEF DESCRIPTION OF THE DRAWINGS

FIGS. 6a, 6a1–6a2, is a circuit diagram of a first alarm detection circuit in accord with the apparatus invention;

FIGS. 7b, 7b1–7b2, is a detailed circuit diagram of the SONET alarm circuit in conjunction with the outgoing SONET multiplexer in accord with the apparatus invention.

DETAILED DESCRIPTION OF THE PREFERRED EMBODIMENTS

Figure 4:
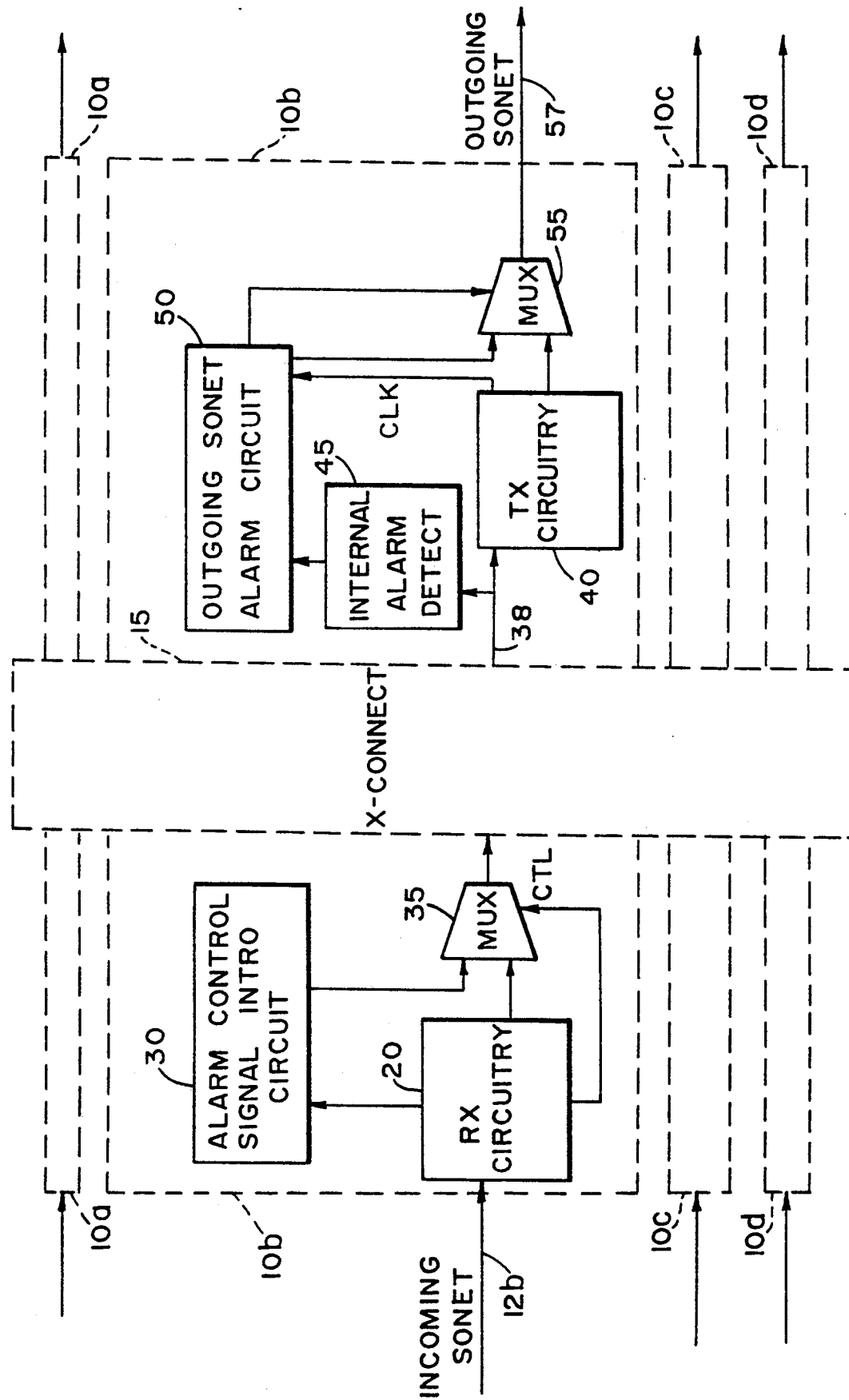
FIG. 4 is a high level block diagram of the apparatus of the invention as part of a SONET terminating device, which in turn is shown as part of a cross-connect system of a plurality of SONET terminating devices.

Turning to FIG. 4, a plurality of SONET terminating devices 10a, 10b, 10c, and 10d, each having receive and transmit sections, are seen interfacing with a cross-connect device 15. The SONET terminating devices may be section terminating devices (STE), line terminating devices (LTE) or path terminating devices (PTE). Details of such terminating devices are disclosed in the aforementioned Bellcore publications, as well as in copending Ser. No. 07/283,171, now issued as U.S. Pat. No. 5,040,170, which is assigned to the assignee hereof. The cross-connect device can take any of many formats. One such device is disclosed in U.S. Pat. No. 4,998,178, which is assigned to the assignee hereof.

High level details of SONET terminating device 10b which includes a receiving portion and a physically separate cross-connected transmitting portion are shown. The terminating device 10b should transmit AIS from its transmitting portion in response to the detection of an alarm condition at the receiving portion within one hundred twenty-five microseconds. It should be, appreciated that receiving portions of terminating devices 10a, 10b, 10c, 10d typically also include transmitting portions which are physically integral therewith; i.e., on the same chip. However, in a cross-connect application with terminating devices, the transmitting portion of a particular chip does not process the same SONET signal which is being received on the receiving portion of that same chip. Thus, for purposes herein, the receiving and transmitting portions of a single terminating device 10a, 10b, 10c, 10d are typically found on separate chips.

Figure 1:
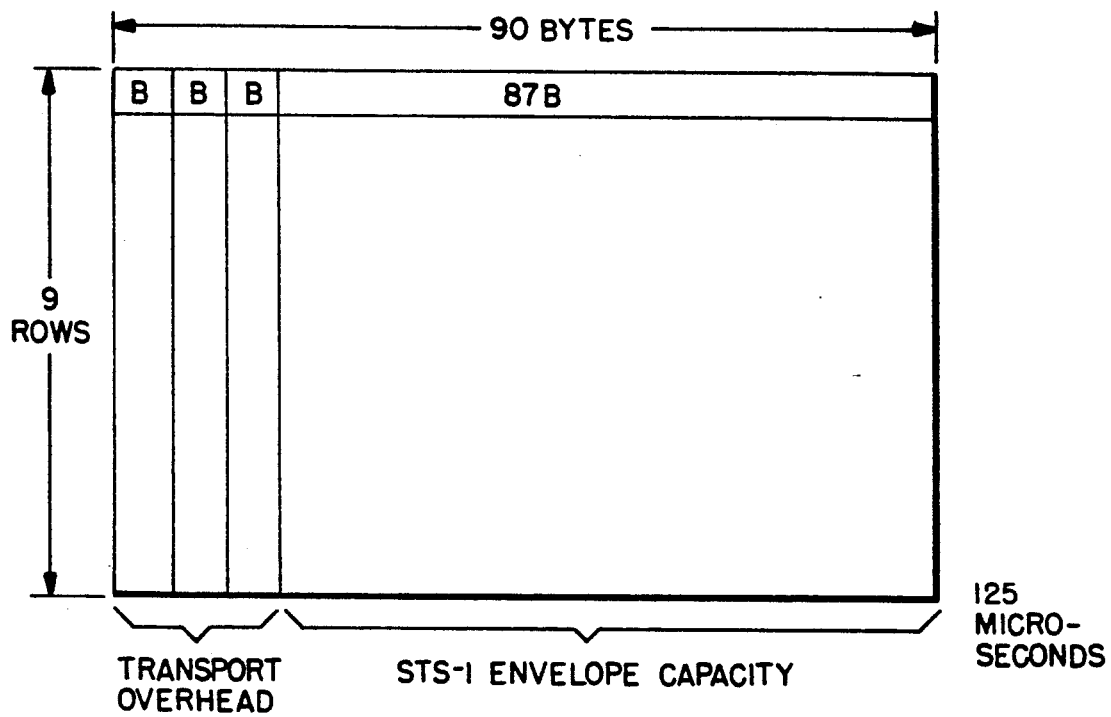
FIG. 1 is a schematic diagram of the layout of a SONET signal frame according to the Bellcore TA-TSY-00253 prior art document.
Figure 2:
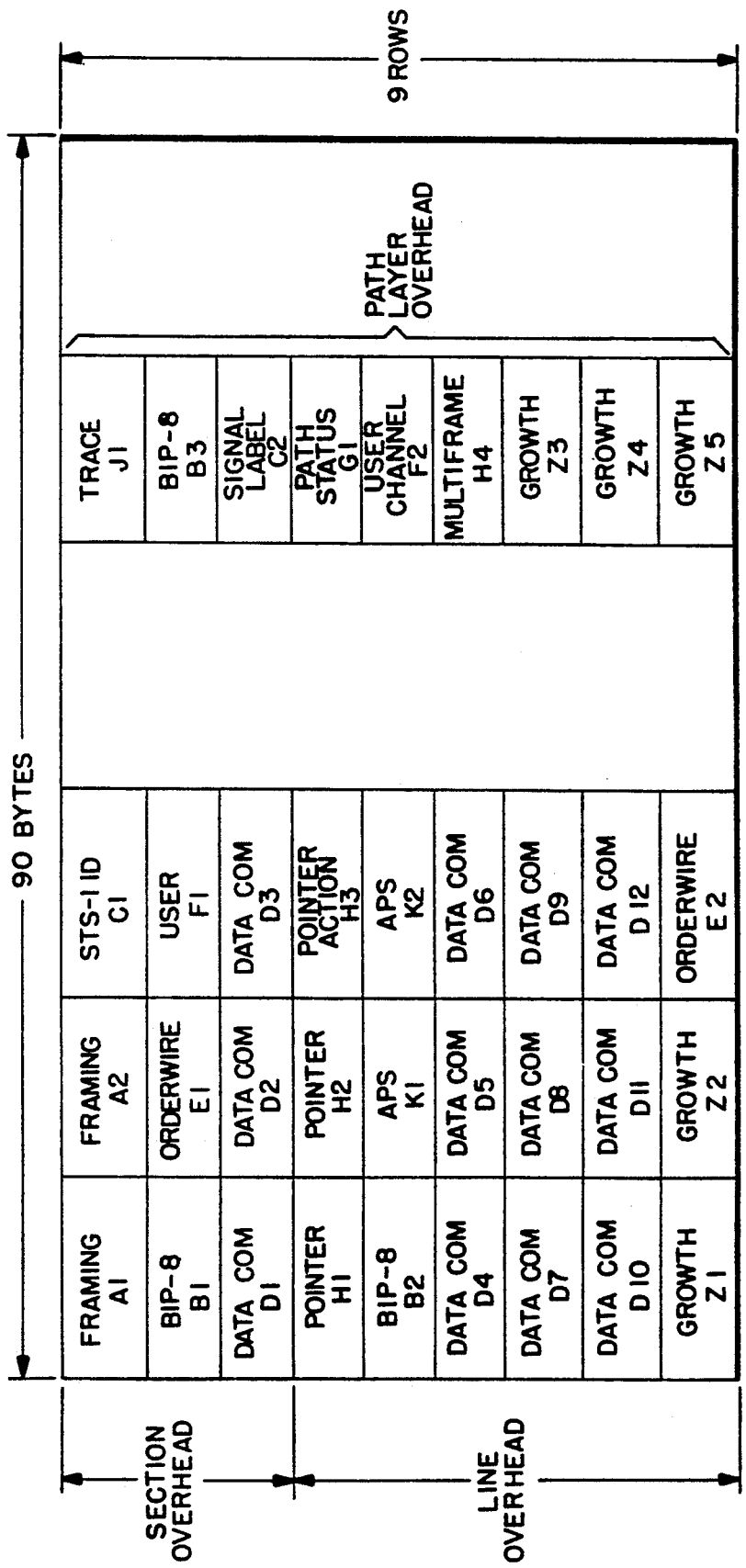
FIG. 2 is a diagram of the overhead byte location in a SONET signal frame according to the Bellcore TA-TSY-00253 prior art document.
Figure 3:
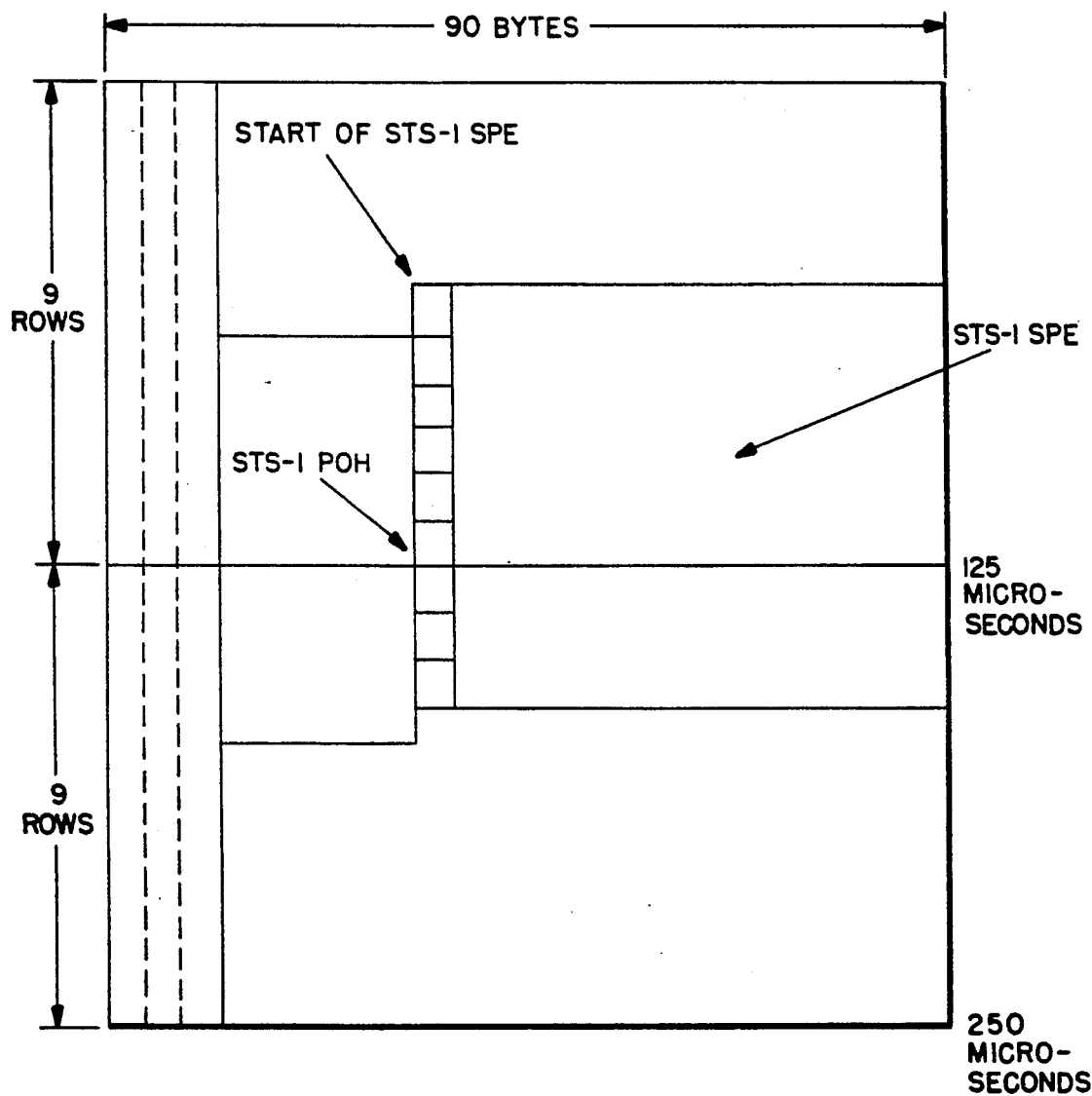
FIG. 3 is a prior art diagram of a typical location of the SONET payload within two SONET signal frames.

The receiving portion of the terminating device 10b receives an incoming SONET signal 12b, and processes the signal 12b in receive circuitry 20. Typically, among other things, the receive circuitry 20 includes demultiplexing circuitry, synchronization circuitry, and failure detection circuitry. The demultiplexing circuitry is used to strip out (i.e. demultiplex) some of the SONET frame overhead. For example, where the terminating device 10b is a STE, the section overhead (see FIG. 2) is stripped out; where the terminating device 10b is a LTE, the entire transport overhead (i.e., section and line overhead) is stripped out; and where the terminating device 10b is a PTE, the TOH and the path overhead is stripped out. The synchronization circuitry is utilized to synchronize the SONET terminating device 10b to the incoming SONET signal. The failure detection circuitry is utilized to detect loss of signal, loss of frame, loss of pointer, as well as incoming alarm indication signals. As the details of demultiplexing, synchronization, and failure detection are known to those in the art and are not critical to an understanding of the invention, details are not provided herein. It should suffice to understand that upon detecting a failure (LOS, LOF, LOP, or Line AIS, or Path AIS), a control signal is sent to the alarm control signal introduction circuit 30 of the invention.

The alarm control signal introduction circuit 30 generally serves to insert an internal alarm control signal into at least one predetermined transport overhead timeslot of the SONET signal upon receiving an indication of a failure condition from the RX circuitry 20. Preferably, the E1 timeslot is utilized for the internal alarm control signal, and the alarm control signal is preferably comprised of all ones. The E1 timeslot information as provided by the alarm control signal introduction circuit 30 is multiplexed with the SONET signal exiting the receive circuitry 20 by multiplexer 35. Multiplexer 35 is under control of the receive circuitry 20 which utilizes the synchronization circuitry contained therein to determine the location of the E1 timeslot. Details of alternative preferred alarm control signal introduction circuits will be discussed hereinafter with reference to FIGS. 5a and 5b.

As seen in FIG. 4, the multiplexed SONET signal, which typically contains the SPE, various overhead bytes, and an E1 signal comprised of all zeros (in the case of no alarm), or all ones (in the case of an alarm), is sent to the transmitting portion of a terminating device 10. Depending upon the circumstances, the signal may be sent cross-connected by a cross-connect circuit 15 such that the receive side of terminating device 10b is coupled to the transmit side of a different terminating device (e.g. 10d), and the transmit side of the terminating device 10b is coupled to the receive side of the same (i.e. 10d) or another (e.g. 10a) terminating device. Regardless of the connections, the SONET signal being received at the transmit side of the terminating device is forwarded both to transmit circuitry 40 and to an internal alarm detect circuit 45.

Typically, among other things, the transmit circuitry 40 of the terminating device 10 includes synchronization circuitry, overhead generation and insertion circuitry. Where no outgoing alarm is generated, the transmit circuitry 40 inserts appropriate overhead signals into the TOH timeslots of the SONET signal 38 received from the cross-connect, thereby generating a complete SONET signal. As the details of the transmit circuitry 40 are known to those skilled in the art, and do not constitute the invention, however, those details are not included herein. It should suffice to note that the transmit circuitry 40 provides appropriate clock signals from which the timing control for particular overhead signals, as well as the timing control for the SPE can be derived.

The internal alarm detect circuit 45 which constitutes a part of the invention is provided for detecting the internal alarm control signal in the E1 and/or other location of the overhead bytes of the SONET signal received via cross-connect 15. Preferably, the internal alarm detect circuit 45 searches the E1 or other predetermined timeslot to determine whether the E1 (and/or other byte) contains a majority of ones (i.e., five or more ones). By not requiring that the alarm signal received be exactly the all one signal which was generated, some error introduced in the multiplexer 35, or cross-connect 15 can be tolerated. Upon determining that an internal alarm has been generated, the internal alarm detect circuit 45 provides a control signal to the outgoing SONET alarm circuit 50 provides an outgoing SONET alarm as defined by the above-referenced Bellcore documents, depending on which type of terminating equipment the terminating equipment 10b is. The outgoing SONET alarm is multiplexed by multiplexer 55 with whatever signal is provided by transmit circuit 40 under control of the internal alarm detect 45 to provide an outgoing SONET signal 57. Addition details of alternative preferred internal alarm detect circuits 45 will be discussed hereinafter with reference to FIGS. 6a and 6b, while addition details of the preferred outgoing SONET alarm circuit 50 will be discussed hereinafter with reference to FIGS. 7a and 7b.

Figure 5A:
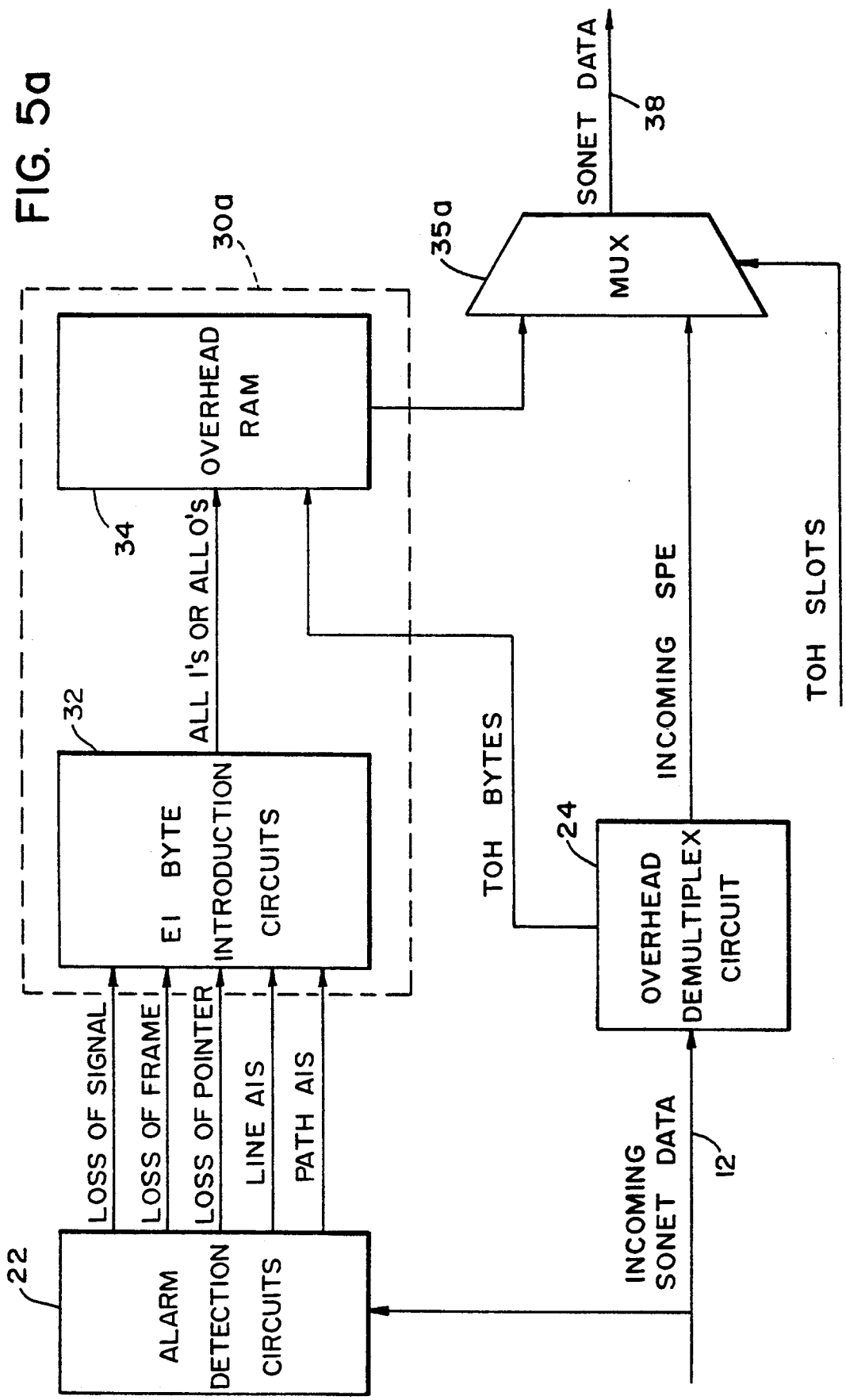
FIG. 5a is a block diagram of a first alarm control signal introduction circuit in accord with the apparatus invention, in conjunction with additional receive circuitry.

A first embodiment of the alarm control signal introduction circuit 30 of the invention is seen with reference to FIG. 5a. As shown in FIG. 5a, an incoming SONET data signal 12 is sent for alarm detection by alarm detection circuits 22. Alarm detection circuits 22 which are typically part of receive circuit 20 previously discussed with reference to FIG. 4, generate control signals such as LOS, LOF, LOP, Line AIS, and Path AIS as indicated. Those control signals are forwarded to an E1 byte introduction circuit 32. The E1 byte introduction circuit 32 may have any of numerous implementations. One implementation comprises an OR gate with the control signal alarms (LOS, LOF, etc.) as inputs thereto. When no control signal is received from the alarm detection circuits 22 (i.e., the alarms are low), the E1 byte introduction circuit writes all zeros to the E1 location of overhead RAM 34. Conversely, when a control signal is received from the alarm detection circuits 22, the E1 byte introduction circuit writes all ones to the E1 location of overhead RAM 34.

As indicated in FIG. 5a, overhead RAM receives overhead byte information from the overhead demultiplex circuit 24 which also receives the incoming SONET data 12 and which strips the overhead therefrom. The overhead demultiplex circuit 24 is also typically part of the receive circuit 20 previously discussed with reference to FIG. 4. The overhead demultiplex circuit 24 may also generate new values for the TOH bytes as desired. Regardless of the value of the E1 byte stripped from the incoming SONET data signal 12 and forwarded to overhead RAM 34, the E1 byte introduction circuit is used to overwrite that information. Hence, when the SPE which leaves the overhead demultiplex circuit is multiplexed by two-input multiplexer 35a with overhead information stored in the overhead RAM, the E1 overhead byte will either contain a signal indicative of an internal alarm condition (all ones), or a signal which is not indicative of an internal alarm (all zeros).

Figure 5B:
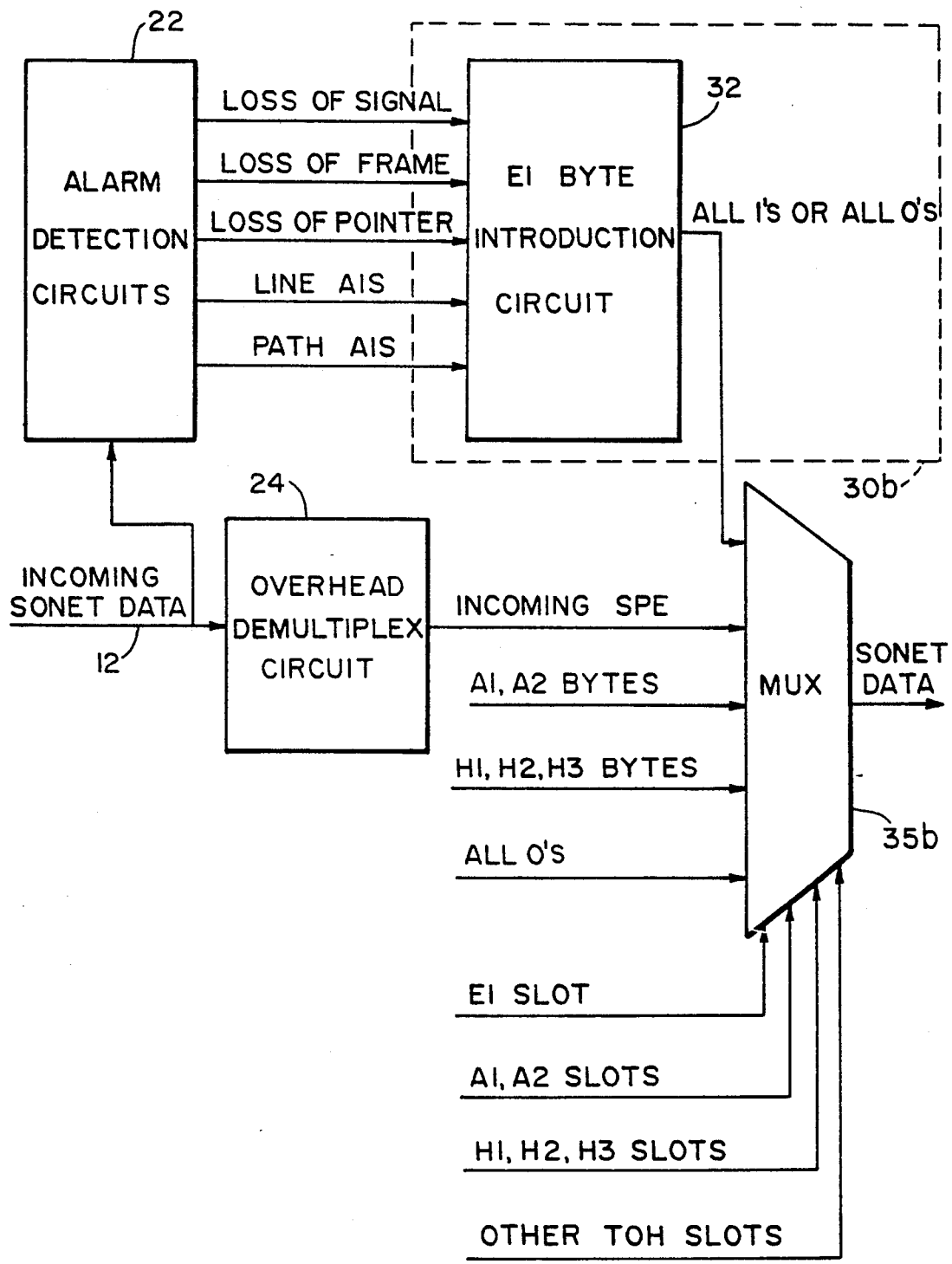
FIG. 5b is a block diagram of an alternative alarm control signal introduction circuit in accord with the apparatus invention, in conjunction with additional receive circuitry.

A second embodiment of the alarm control signal introduction circuit b of the invention is seen with reference to FIG. 5b which is similar to FIG. 5a, as it includes an E1 byte introduction circuit 32 in conjunction with; alarm detection circuits 22, and an overhead, demultiplex circuit 24. Again, the E1 byte introduction circuit 32 may comprise an OR gate providing all ones when any of the alarm signals (e.g. LOF, LOP, etc.) are active, and all zeros when all of the alarm signals are inactive. While FIG. 5a and FIG. 5b are similar, in FIG. 5b no overhead RAM is provided. Instead, multiplexer 35b is a five-input multiplexer having at least four controls. When, the E1 timeslot control is pulsed, multiplexer 35b accepts information from the E1 byte introduction circuit 32. When the A1, A2 timeslot control is pulsed, multiplexer 35b accepts the A1, A2 byte inputs which are generated by a framing pattern generator (which is part of receive circuitry 20). When the H1, H2, H3 timeslot control is pulsed, multiplexer 35b accepts the H1, H2, and H3 byte inputs generated by a pointer generator (also part of receive circuitry 20), and when the Other TOH timeslot control is pulsed, multiplexer 35b accepts all zero information from a voltage source (i.e. ground or zero volts). When none of the four listed controls are pulsed, multiplexer 35b accepts the incoming SPE information which is forwarded from the overhead demultiplex circuit 24.

Figures 2, 6A:
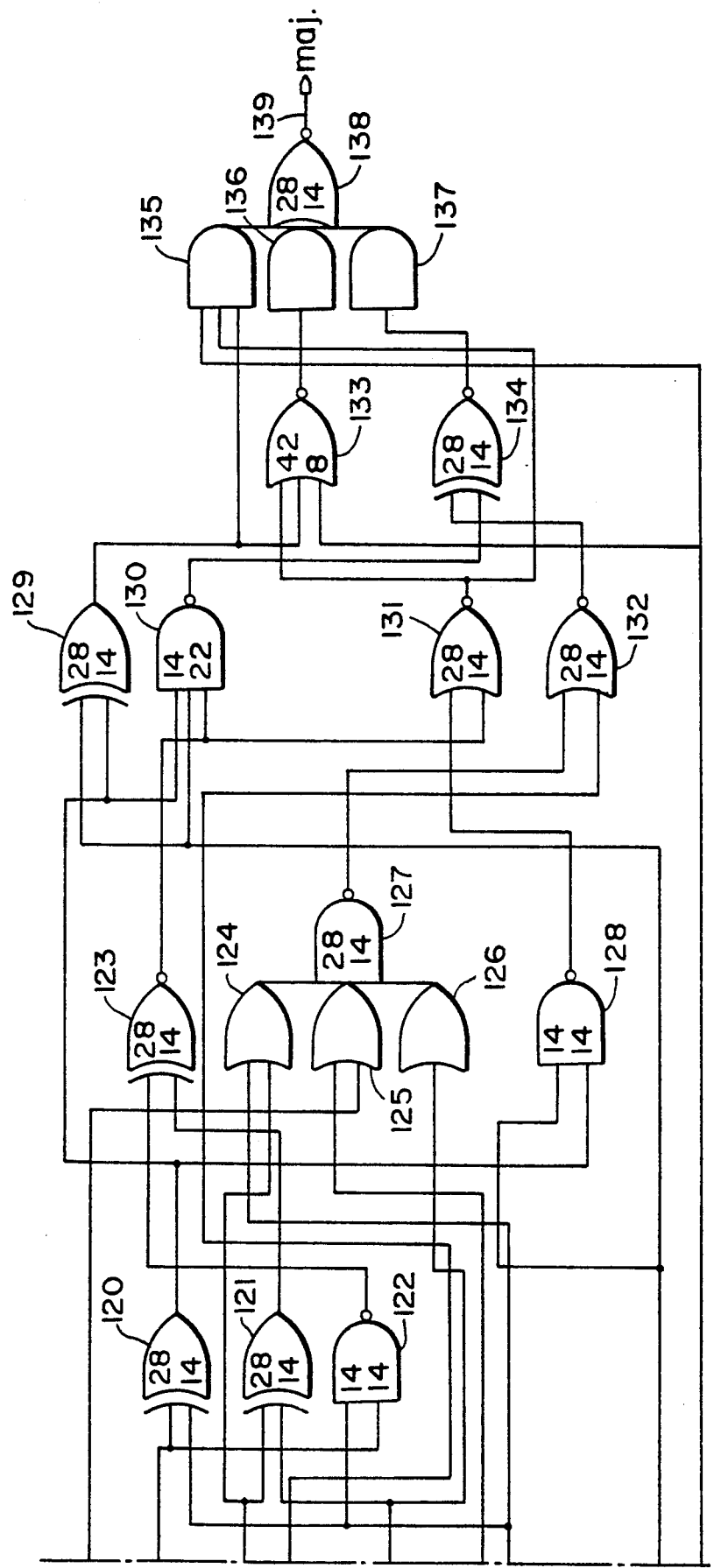

Turning to FIG. 6a, details of a preferred internal alarm detection circuit 45a are seen. The inputs into the internal alarm detection circuit 45a are inputs zero through seven, and are the eight bits which constitute the E1 byte. Internal alarm detection circuit 45a was generated using automatic logic circuit determination means available from Mentor Graphics Corp. of Beaverton, Oreg., under the name of "Autologic", and comprises AND gates 101, 102, and 103, NOR gate 104, XOR gates 105 and 106, NAND gate 107, inverter 108, XOR gate 109, OR gates 110, 111, and 112, NAND gate 113, XOR gate 115, AND gate 116, OR gates 117 and 118, NAND gate 119, XOR gates 120 and 121, NAND gate 122, XNOR gate 123, OR gates 124, 125, and 126, NAND gates 127 and 128, XOR gate 129, NAND gate 130, XNOR gates 131 and 132, NOR gate 133, XNOR gate 134, AND gates 135, 136, and 137, and NOR gate 138. With the circuitry connected as shown, a control signal 139 is generated without significant delay which indicates whether or not the majority of the eight inputs have a value of one. If the majority of the eight inputs have a value of one, the control signal output 139 is used to indicate that an alarm condition is present. On the other hand, if the majority of the eight inputs do not have a value of one, the control signal output 139 indicates that no alarm condition is present.

Figure 6B:
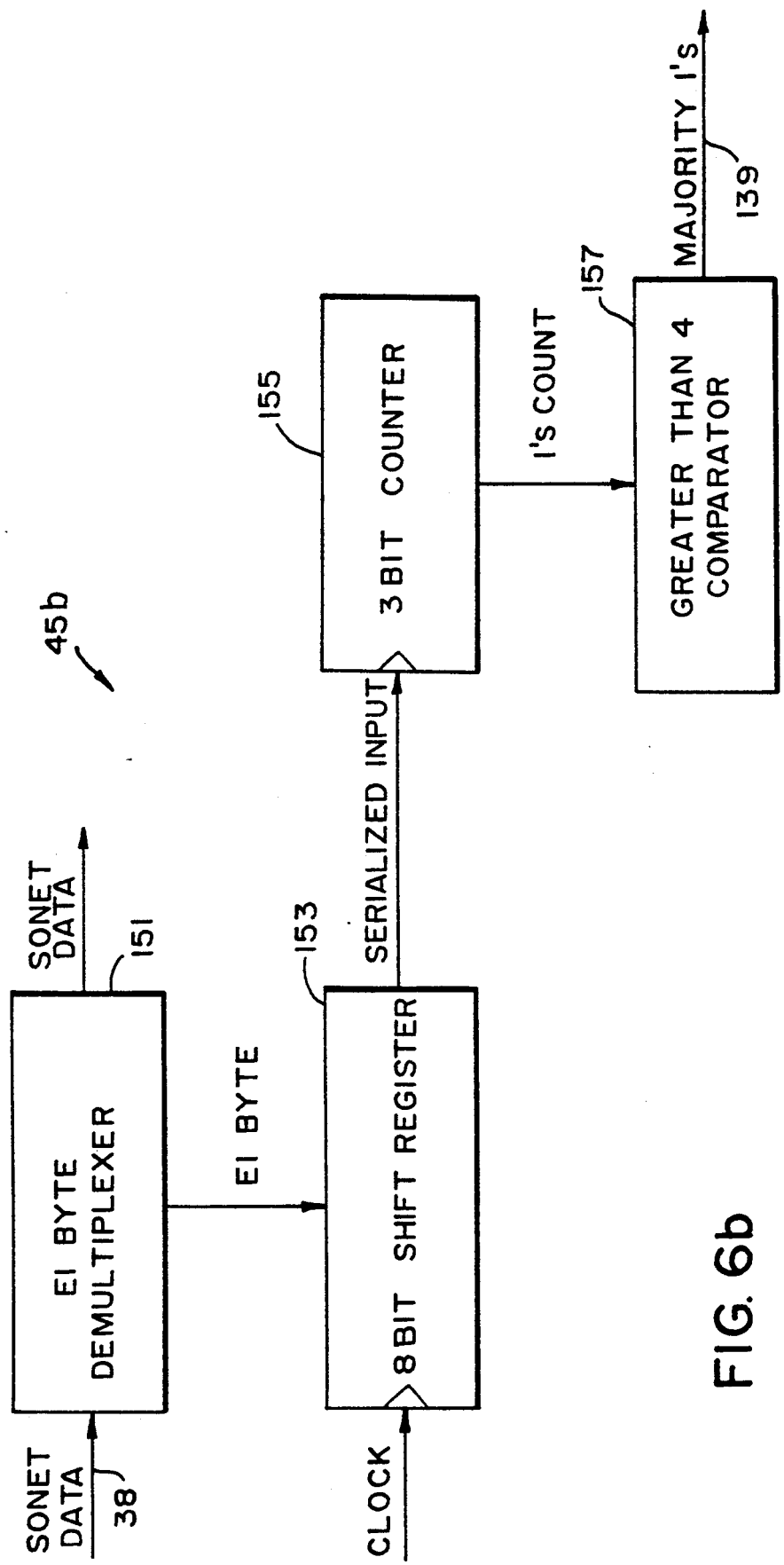
FIG. 6b is a block diagram of an alternative alarm detection circuit in accord with the apparatus invention.

Another internal alarm detection circuit 45b is shown in FIG. 6b which receives the E1 byte from the E1 byte demultiplexer 151. The alarm detection circuit 45b is comprised of an eight bit shift register 153, a three bit counter 155, and a greater than four comparator 157. The E1 byte is loaded into the eight bit shift register 153 which is shifted in a serial manner into the three bit counter 155. The three bit counter 155 adds the bit values it receives from the eight bit shift register and forwards the value to the greater than four comparator 157. If the value received by the three bit counter is greater than four (101 digital or larger), a majority one control signal indicates than alarm condition is present. If the value received by the three bit counter is not greater than four (100 digital or less), the output control signal indicates that an alarm condition is not present.

Figure 7A:
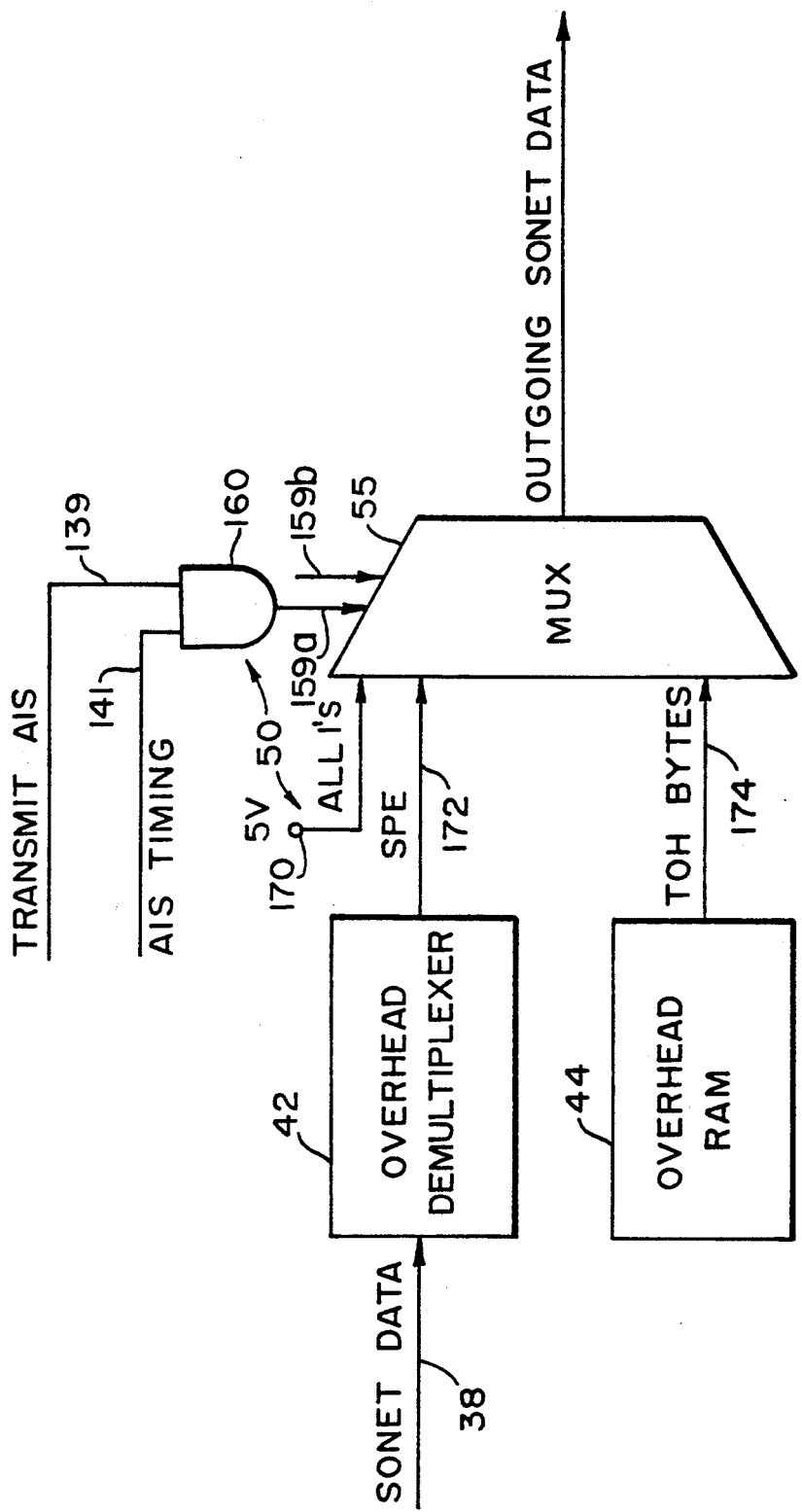
FIG. 7a is a block diagram of an outgoing SONET alarm circuit in accord with the apparatus invention, in conjunction with additional transmit circuitry.

A high level block diagram of the outgoing SONET alarm circuit 50 of the invention, in conjunction with additional transmit circuitry is seen in FIG. 7a. As shown in FIG. 7a, the outgoing SONET alarm circuit 50 comprises an AND gate 160 and a 5V source 170. The AND gate 160 does a logical AND function on the transmit AIS control signal 139 generated by the internal alarm detection circuit 45, and an AIS timing signal generated by the transmit circuitry 40 of FIG. 4. The AIS timing signal is generated in accord with the type of AIS signal to be transmitted, as discussed above with reference to Bellcore document TA-TSY-00253. When the transmit AIS signal, and the AIS timing signal are both high, multiplexer 55 is controlled at control input 59a to pass an all ones signal generated by voltage source 170 of the outgoing SONET alarm circuit 50. Otherwise, multiplexer 55 passes SPE data 172 which is obtained through overhead demultiplexer 42, or transport overhead information 174 supplied by overhead RAM 44 based on control 159b which supplies a clock signal relating to the SPE timeslots. It will be appreciated by those skilled in the art that the overhead demultiplexer 42, which removes the overhead signals being received from the cross-connect 15, as well as the overhead RAM 44, which stores overhead information for properly forming a new SONET signal, are both typically included in the transmit circuitry 40 of FIG. 4.

Figures 1, 7B:
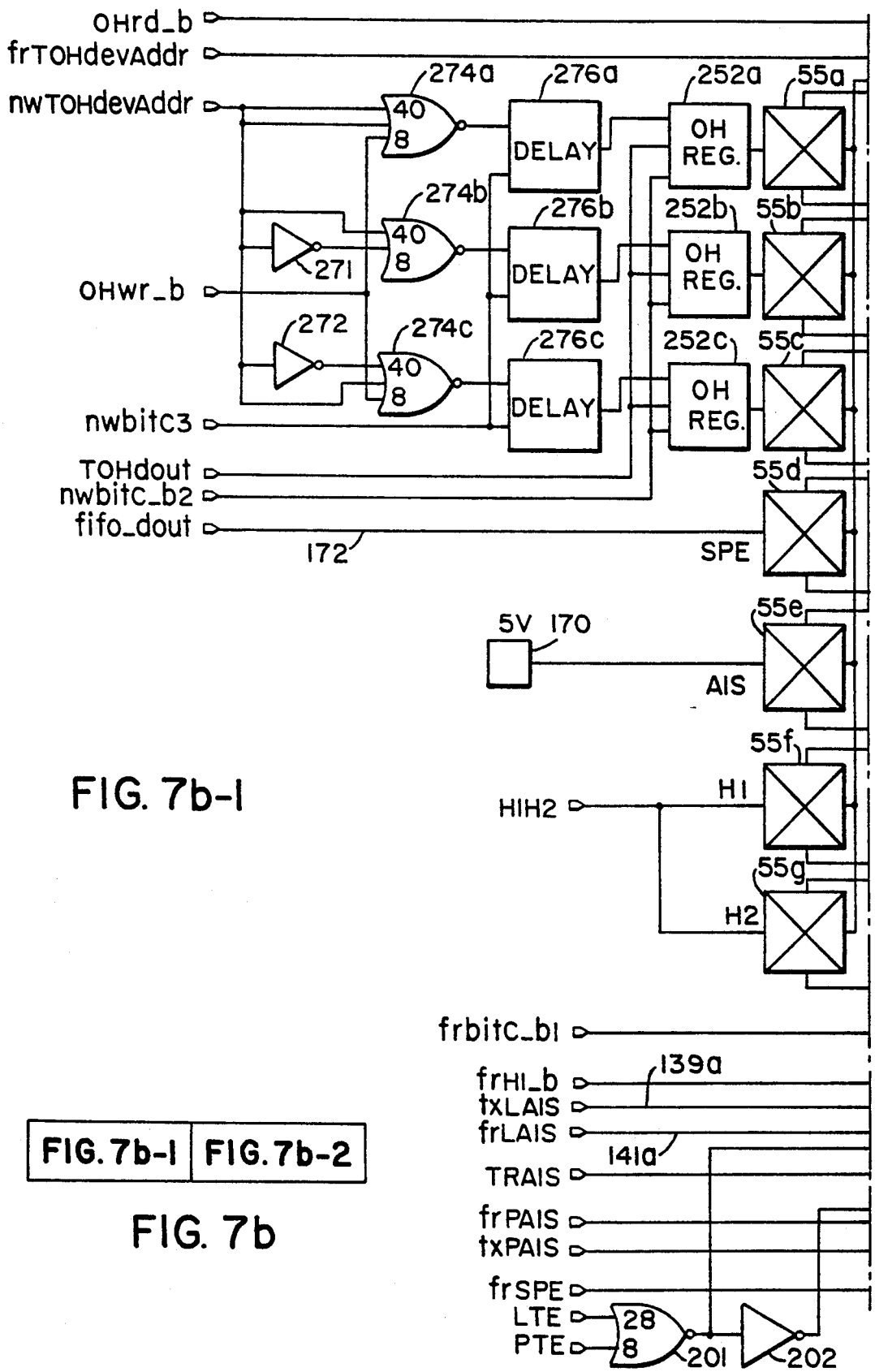
Figures 2, 7B:
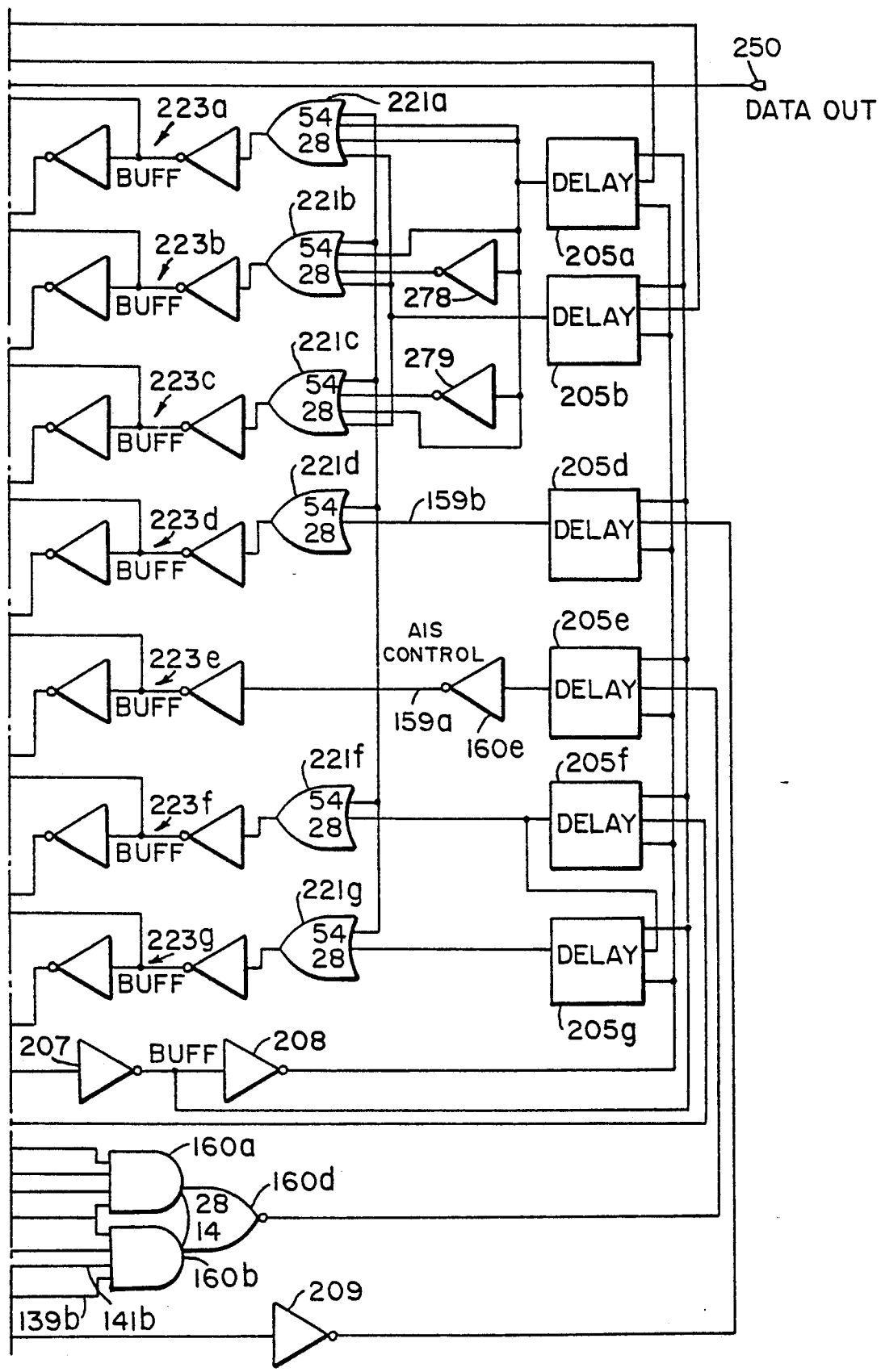

Details of the outgoing SONET alarm circuit in conjunction with the multiplexer and some transmit circuitry are seen in FIG. 7b. The inputs into the preferred SONET alarm circuit are two mode control signals, five timing signals, and two alarm control signals. The two mode control signals are LTE (line terminating equipment enable) and PTE (path terminating equipment enable). When both LTE and PTE are low, NOR gate 201 provides a high output, and inverter 202 provides a low output. As will be discussed below, these results are indicative of a STE apparatus which provides a Line AIS output. On the other hand, if either the LTE or PTE controls are high, indicating that the equipment is a LTE or PTE, NOR gate 201 provides a low output, and inverter 202 provides a high output. As a result, the equipment will provide a Path AIS signal as discussed below. If desired, the LTE and PTE inputs are preset by the manufacturer depending on the equipment in which the outgoing SONET alarm circuit is utilized.

The five input timing signals are frSPE (SPE frame timing), frPAIS (Path AIS timing), frLAIS (Line AIS timing), frH1_b (H1 byte location), and frbitC_b1 (byte clock). These clocks are generated by the transmit circuitry 40 of FIG. 4. As will be appreciated by those skilled in the art, the frPAIS and frLAIS timing signals are easily generated in the transmit circuitry 40 in accord with the previously discussed Bellcore specifications such that the the timing signal goes high whenever a byte timeslot occurs which requires an alarm signal according to the Path AIS or Line AIS standards.

The two alarm control signals txLAIS (transmit Line AIS), and txPAIS (transmit Path AIS) represent the signal 139 which is output by the internal alarm detect circuitry of FIGS. 6a or 6b for indicating that an alarm should be generated. As indicated in FIG. 7b (and 7a), the transmit control signal txLAIS and timing signal frLAIS are input into AND gate 160a, and the transmit control signal txPAIS and timing signal frPAIS are input into AND gate 160b. When both inputs to either AND gate are high, NOR gate 160d outputs a low signal. Otherwise, NOR gate 106d outputs a high signal. The output of NOR gate 160d is fed through delay element 205e and through inverter 160e, and effectively acts as the AIS control signal 159a to multiplexer 55 as will be discussed hereinafter. Other inputs into delay element 205d (as well as into the other delay elements 205a, 205b, 205d, 205f and 205g) relate to the system byte clock frbitC_b1 which is buffered by inverters 207 and 208.

For sake of completeness, it should be noted that the frSPE clock signal is inverted by inverter 209 and sent to delay element 205d. Delay element 205d effectively supplies the multiplexer SPE control signal 159b as delay element 205d is coupled via OR gate 221d and buffer 223d to multiplexer gate element 55d which receives the SPE date (fifo_dout). Also, the H1 timing signal frH1_b is input to delay element 205f. Delay element 205f is coupled via OR gate 221f and buffer 223f to multiplexer gate element 55f which receives the H1 control byte. The output of delay element 205f is also fed as an input to delay element 205g. Delay element 205g is coupled via OR gate 221g and buffer 223g to multiplexer gate element 55g which receives the H2 control byte.

Returning to the AIS control signal 159a generated at the output of delay element 205e and inverter 160e, when the AIS control signal is low (no AIS), any of OR gates 221a, 221b, 221c, 221d, 221f and 221g may be enabled by a high signal from their respective delay inputs. In this manner, the respective data or overhead signals may be fed through the enabled multiplexer gate element (55a, 55b, 55c, 55d, 55f or 55g) as required. On the other hand, if the AIS control signal is high (AIS enabled), the high signal is forwarded via buffer 223e to multiplexer gate element 55e. In turn, multiplexer gate element 55e passes a value one (5V) generated by voltage source 170, thereby pulling the data out line 250 high regardless of what other multiplexer gates might be enabled. In this manner, an outgoing AIS alarm is generated.

The remainder of the circuitry shown in FIG. 7b relates to the generating and timing of the TOH bytes. Besides the H1H2 input signal and the SPE data signal (fifo dout) previously mentioned, seven additional signals are provided by the transmit circuitry 40, including: frTOHdevAddr and nwTOHdevAddR (which together provide timing signals to control which local overhead register 252a, 252b, or 252c is read from and written to); OHwr_b (controls reading from overhead RAM 44 and writing to local overhead registers 252a—252c); OHrd_b (controls reading from local registers 252a252c onto the multiplexer gate elements); nwbitC3 and nwbitC_b2 (network byte clocks of different phases); and TOHdout (the TOH data bytes received from overhead RAM 44). The provided signals are sent through various logic and delay gates, including inverters 271, 272, NOR gates 274a, 274b, 274c, delay elements 276a, 276b, 276c, inverters 278 and 279, which in conjuction with delay elements 205a and 205b, OR gates 221a-221c, and buffers 223a-223c control what is multiplexed onto the data out line 250. The functioning of the logic elements and delay gates will be evident to those skilled in the art.

Figure 8:
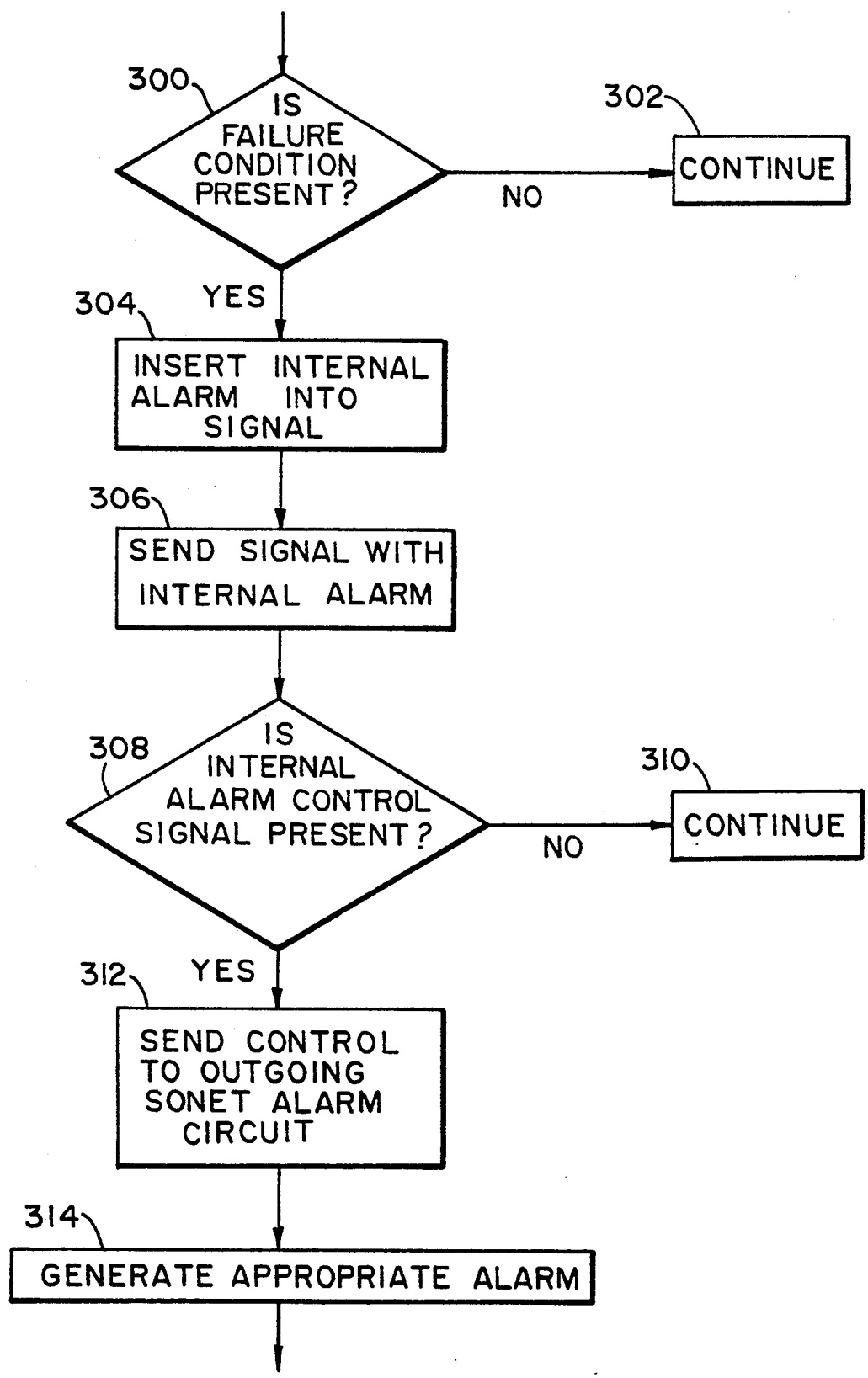
FIG. 8 is a flow chart of the method of the invention.

Turning to FIG. 8, a flow chart of the method invention is seen. As seen at 300, the SONET terminating equipment detects whether or not a failure condition is present. If not, at 302 the equipment carries out its required function. If a failure condition is detected, at 304 an internal alarm control signal is inserted by the receive apparatus into at least one predetermined transport overhead timeslot of the signal, and the signal with the internal alarm is sent out of the receive apparatus at 306. Typically after cross-connection, a transmit apparatus which is part of the SONET terminating equipment receives the SONET signal from the receive equipment and determines at 308 whether an indication of the internal alarm control signal is present. If not, at 310, the transmit apparatus carries out its required function. If, on the other hand, it is determined that an internal alarm has been inserted into the signal, the internal alarm detection circuit provides a signal at 312 to the outgoing SONET alarm circuit which at 314 inserts an appropriate alarm in predetermined data and control timeslots of the outgoing SONET frame signal.

As previously mentioned, according to the proposed standards, the outgoing alarm signal should be generated by the transmit apparatus within 125 $\mu$secs after the receive apparatus receives an alarm indication or determines an alarm condition. While in the preferred embodiment only one timeslot (preferably E1) is utilized for an internal alarm control signal which would cause the outgoing alarm to be generated, it will be appreciated that where only one timeslot is used, in certain circumstances (e.g., when an alarm condition is determined immediately after the E1 byte), it might not be possible to meet the required time limitations. To guarantee that the outgoing alarm indication signal is generated within 125 $\mu$secs after an alarm condition is detected, at least two overhead timeslots may be used for the internal alarm control signal. For section terminating equipment (STE), the two bytes should be located in the section overhead and might be the E1 and D3 bytes. For line terminating equipment (LTE), the two bytes should be located in the TOH, and might include the E1, and either the Z1, Z2, or E2 bytes (although others could be utilized). For path terminating equipment (PTE), it is possible to use the bytes located in the POH as well as the TOH, and hence the E1 and, e.g., Z3 bytes might be utilized.

In choosing more than one byte to carry the internal alarm, only insignificant changes would be required to the circuitry. In the alarm control signal introduction circuit 30, instead of inserting an all ones signal only in the E1 timeslot, an all ones signal would also be inserted in the additionally chosen timeslot. Then, in the transmit apparatus, instead of sending only the E1 byte when received, both the E1 byte and whatever other byte was chosen would be forwarded when received to the internal alarm detect circuit 45. As a result, if the internal alarm signal were carried in either of the chosen bytes, an alarm signal would be generated by the internal alarm detect and forwarded to the outgoing SONET alarm circuit in enough time to generate the required outgoing alarm signal.

There have been described and illustrated herein apparatus and methods for generating SONET AIS signals. While particular embodiments of the invention have been described, it is not intended that the invention be limited thereby, as it is intended that the invention be as broad in scope as the art will allow. Thus, it is understood by those skilled in the art that while particular circuitry was provided, the circuitry is by way of example only, and that other circuitry can be provided and used in accord with the teachings of the invention. Also, while a preferred internal alarm signal was described (e.g., all ones), and a criterion for an internal alarm detect was described (majority ones), it will be appreciated that other signals (e.g., all zeros, alternating ones and zeros, or other patterns), could be utilized if desired, and other criteria for detection could be similarly utilized. Further, while the SONET E1 timeslot was described as being the preferred timeslot for insertion of the internal alarm signal, it will be appreciated that depending upon the type of terminating equipment being utilized, other timeslots could be utilized. In fact, more than one other timeslot could be used depending upon the circumstances. Therefore, it will be appreciated by those skilled in the art that yet other modifications could be made to the provided invention without deviating from its spirit and scope as so claimed.

I claim:

1. In a chip having a first SONET terminating device receive section and a second SONET terminating device transmit section, with the receive section having means for receiving an incoming SONET signal having overhead and payload timeslots and means for detecting an alarm condition therefrom, and the transmit section having means for transmitting an outgoing second SONET signal, an apparatus for generating a SONET alarm in said outgoing second SONET signal, comprising:
   a) in said receive section, an alarm control signal introduction means for receiving an indication of said alarm condition from said means for detecting an alarm condition, and for inserting an internal alarm control signal into at least one predetermined of said overhead timeslots of said incoming SONET signal;
   b) in said transmit section, an internal alarm detector means for detecting an indication of an internal alarm control signal in said overhead timeslot, and for generating a second control signal upon detection thereof; and
   c) in said transmit section, an outgoing SONET alarm means for receiving said second control signal, and for inserting in response to said second control signal a desired alarm indication signal into predetermined bytes of said outgoing second SONET signal being transmitted by said means for transmitting.

2. An apparatus according to claim 1, wherein:
said internal alarm control signal inserted by said alarm control signal introduction means comprises a byte of all ones.

3. An apparatus according to claim 1, wherein:
said internal alarm detector means comprises means for detecting the presence of at least a predetermined number of ones in said predetermined overhead timeslot.

4. An apparatus according to claim 3, wherein:
said means for detecting the presence of at least a predetermined number of ones comprises a logic circuit means having a plurality of logic gate components.

5. An apparatus according to claim 3, wherein:
said means for detecting the presence of at least a predetermined number of ones comprises a shift register for receiving said byte in said predetermined overhead timeslot, a counter coupled to said shift register for receiving bits of said byte serially and determining an indication of the number of ones contained in said byte, and a comparator for comparing said predetermined number with said indication of the number of ones contained in said byte.

6. An apparatus according to claim 1, wherein:
said internal alarm control signal inserted by said alarm control signal introduction means comprises a byte containing a predetermined pattern of bits.

7. An apparatus according to claim 1, wherein:
said at least one predetermined overhead timeslot comprises an E1 timeslot of a SONET signal.

8. An apparatus according to claim 1, wherein:
said first and second SONET terminating devices are section terminating devices.

9. An apparatus according to claim 8, wherein:
said at least one predetermined overhead timeslot comprises at least two predetermined timeslots located in the section overhead of a SONET signal.

10. An apparatus according to claim 9, wherein:
at least one of said at least two predetermined timeslots is an E1 timeslot of a SONET signal.

11. An apparatus according to claim 1, wherein:
said first and second SONET terminating devices are line terminating devices.

12. An apparatus according to claim 11, wherein:
said at least one predetermined timeslot comprises at least two predetermined timeslots located in the TOH overhead of a SONET signal.

13. An apparatus according to claim 12, wherein:
at least one of said at least two predetermined timeslots is an E1 timeslot of a SONET signal.

14. An apparatus according to claim 1, wherein:
said first and second SNET terminating devices are path terminating devices.

15. An apparatus according to claim 14, wherein:
said at least one predetermined timeslot comprises at least two predetermined timeslots located in one and/or other of the TOH and POH overhead of a SONET signal.

16. An apparatus according to claim 14, wherein:
at least one of said at least two predetermined timeslots is an E1 timeslot of a SONET signal.

17. An apparatus according to claim 1, wherein:
said desired alarm indication signal inserted into predetermined bytes of said outgoing SONET signal comprises at least one of a path AIS and a line AIS signal.

18. In a SONET terminating device with a receive section cross-connected with a transmit section, said receive section having means for receiving an incoming SONET signal having overhead and payload timeslots and means for detecting an alarm condition therefrom, and said transmit section having means for transmitting an outgoing SONET signal, an apparatus for generating a SONET alarm signal, comprising:
   a) in said receive section, an alarm control signal introduction means for receiving an indication of said alarm condition from said means for detecting an alarm condition, and for inserting an internal alarm control signal into at least one predetermined of said overhead timeslots of said incoming SONET signal; b) in said transmit section, an internal alarm detector means for detecting an indication of said internal alarm control signal in said overhead timeslot, and for generating a second control signal upon detection thereof; and c) in said transmit section, an outgoing SONET alarm means for receiving said second control signal, and for inserting in response to said second control signal a desired alarm indication signal into predetermined bytes of said outgoing SONET signal being transmitted by said transmit means.

19. An apparatus according to claim 18, wherein:
said internal alarm control signal inserted by said alarm control signal introduction means comprises a byte of all ones.

20. An apparatus according to claim 19, wherein:
said internal alarm detector means comprises means for detecting the presence of at least a predetermined number of ones in said predetermined overhead timeslot.

21. An apparatus according to claim 20, wherein:
said means for detecting the presence of at least a predetermined number of ones comprises a logic circuit means having a plurality of logic gate components.

22. An apparatus according to claim 20, wherein:
said means for detecting the presence of at least a predetermined number of ones comprises a shift register for receiving said byte in said predetermined overhead timeslot, a counter coupled to said shift register for receiving bits of said byte serially and determining an indication of the number of ones contained in said byte, and a comparator for comparing said predetermined number with said indication of the number of ones contained in said byte.

23. An apparatus according to claim 18, wherein:
aid internal alarm control signal inserted by said alarm control signal introduction means comprises a byte containing a predetermined pattern of bits.

24. An apparatus according to claim 18, wherein:
said at least one predetermined overhead timeslot comprises an E1 timeslot of said incoming SONET signal.

25. An apparatus according to claim 18, wherein: said SONET terminating device is a section terminating device.

26. An apparatus according to claim 25, wherein:
said at least one predetermined overhead timeslot comprises at least two predetermined timeslots located in the section overhead of said incoming SONET signal.

27. An apparatus according to claim 26, wherein:
at least one of said, at least two predetermined timeslots is an E1 timeslot of said incoming SONET signal.

28. An apparatus according to claim 18, wherein:
said SONET terminating device is a line terminating device.

29. An apparatus according to claim 28, wherein:
said at least one predetermined timeslot comprises at least two predetermined timeslots located in the TOH overhead of said incoming SONET signal.

30. An apparatus according to claim 29, wherein:
at least one of said at least two predetermined timeslots is an E1 timeslot of said incoming SONET signal.

31. An apparatus according to claim 18, wherein:
said SONET terminating device is a path terminating device.

32. An apparatus according to claim 31, wherein:
said at least one predetermined timeslot comprises at least two predetermined timeslot located in one and/or other of the TOH and POH overhead of said incoming SONET signal.

33. An apparatus according to claim 31, wherein:
at least one of said at least two predetermined timeslots is an E1 timeslot of said incoming SONET signal.

34. An apparatus according to claim 18, wherein:
said desired alarm indication signal inserted into predetermined bytes of said outgoing SONET signal comprises at least one of a path AIS and a line AIS signal.

35. A method for generating in a transmit section of a SONET terminating equipment means an outgoing SONET alarm signal upon detection by a receive section of that SONET terminating equipment means coupled to said transmit section, of an alarm condition related to an incoming SONET signal, said method comprising:

a) upon detecting said alarm condition in said incoming SONET signal by said receive section, inserting an internal alarm control signal into at least one predetermined overhead timeslot of said incoming SONET signal, thereby creating an internally alarmed SONET signal;

b) sending said internally alarmed SONET signal to said transmit section;

c) at transmit section, detecting an indication of said internal alarm control signal, and inserting an appropriate alarm in predetermined overhead and payload timeslots of said outgoing SONET signal.

36. A method according to claim 35, wherein:
said internal alarm control signal inserted in step a) comprises a byte of all ones.

37. A method according to claim 36, wherein:
said step of detecting an indication of said internal alarm control signal comprises detecting the presence of at least a predetermined number of ones in said predetermined overhead timeslot.

38. A method according to claim 35, wherein:
said internal alarm control signal inserted in step a) comprises a byte containing a predetermined pattern of bits.

39. A method according to claim 35, wherein:
said at least one predetermined overhead timeslot comprises an E1 timeslot of said incoming SONET signal.

40. A method according to claim 35, wherein:
said SONET terminating equipment means, is a section terminating device, and said at least one predetermined overhead timeslot comprises at least two predetermined timeslots located in the section overhead of said incoming SONET signal.

41. A method according to claim 40, wherein:
at least one of said at least two predetermined timeslots is an E1 timeslot of said incoming SONET signal.

42. A method according to claim 35, wherein:
said SONET terminating equipment means, is a line terminating device, and said at least one predetermined timeslot comprises at least two predetermined timeslots located in the TOH overhead of said incoming SONET signal.

43. A method according to claim 42, wherein:
at least one of said at least two predetermined timeslots is an E1 timeslot of said incoming SONET signal.

44. A method according to claim 35, wherein:

said SONET terminating equipment means, is a path terminating device, and said at least one predetermined timeslot comprises at least two predetermined timeslots located in one and/or other of the TOH and POH overhead of said incoming SONET signal.

45. A method according to claim 44, wherein:
at least one of said at least two predetermined timeslots is an E1 timeslot of said incoming SONET signal.

46. An apparatus according to claim 35 wherein:
said appropriate alarm inserted into predetermined overhead and data timeslots of said outgoing SONET signal comprises at least one of a path AIS and a line AIS signal.

* * * * *